US012321140B2

(12) United States Patent
Wang et al.

(10) Patent No.: US 12,321,140 B2
(45) Date of Patent: Jun. 3, 2025

(54) MOTION CONTROL METHOD AND APPARATUS

(71) Applicant: Siemens Aktiengesellschaft, Munich (DE)

(72) Inventors: Zi Jian Wang, Beijing (CN); Shun Jie Fan, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 18/695,083

(22) PCT Filed: Sep. 26, 2021

(86) PCT No.: PCT/CN2021/120801
§ 371 (c)(1),
(2) Date: Mar. 25, 2024

(87) PCT Pub. No.: WO2023/044878
PCT Pub. Date: Mar. 30, 2023

(65) Prior Publication Data
US 2024/0337990 A1    Oct. 10, 2024

(51) Int. Cl.
G05B 13/02    (2006.01)
(52) U.S. Cl.
CPC .................. G05B 13/028 (2013.01)
(58) Field of Classification Search
CPC .................................... G05B 13/028
See application file for complete search history.

(56) References Cited

U.S. PATENT DOCUMENTS

| 2016/0196765 A1 | 7/2016 | Stauch | G09B 19/00 |
| 2018/0129970 A1* | 5/2018 | Gottschlich | G06N 3/08 |
| 2022/0250656 A1* | 8/2022 | Ucar | G06V 20/56 |

FOREIGN PATENT DOCUMENTS

| CN | 109 240 280 | 1/2019 | G05D 1/02 |
| CN | 109 352 648 | 2/2019 | B25J 9/16 |

(Continued)

OTHER PUBLICATIONS

Jason Brownleee, How to Update Neural Network Models With More Data,Feb. 21, 2022, Machine Learning Mastery, https://machinelearningmastery.com/update-neural-network-models-with-more-data/ (Year: 2021).*

(Continued)

Primary Examiner — Tameem D Siddiquee
(74) Attorney, Agent, or Firm — Slayden Grubert Beard PLLC

(57) ABSTRACT

Some embodiments of the teachings herein include a motion control method. An example includes: creating a motion control model; training an online reinforcement learning model using the model; producing feedback with a controlled object, a model control value, and an initial control value; calculating a reward using the control value and the feedback; generating a residual control value using the online reinforcement learning model based on the reward, the model control value, and the feedback; controlling motion of the object with the residual control value and the model control value; sending the motion control model, the model control value, the feedback, and the reward to the cloud; training an offline model with the motion control model, the model control value, the feedback value, and the reward; and updating the existing online model using the offline model or deploying the offline model in a motion control system without an online model.

4 Claims, 4 Drawing Sheets

(56) References Cited

FOREIGN PATENT DOCUMENTS

| CN | 109 581 874 | | 4/2019 | ............. G05B 13/04 |
|----|-------------|---|--------|--------------------------|
| CN | 112 698 572 | | 4/2021 | ............. G05B 13/04 |
| CN | 112936290 | * | 6/2021 | ................ B25J 9/16 |
| JP | 2005 199383 | | 7/2005 | ................ B25J 5/00 |

OTHER PUBLICATIONS

Search Report for International Application No. PCT/CN2021/120801, 15 pages.

* cited by examiner

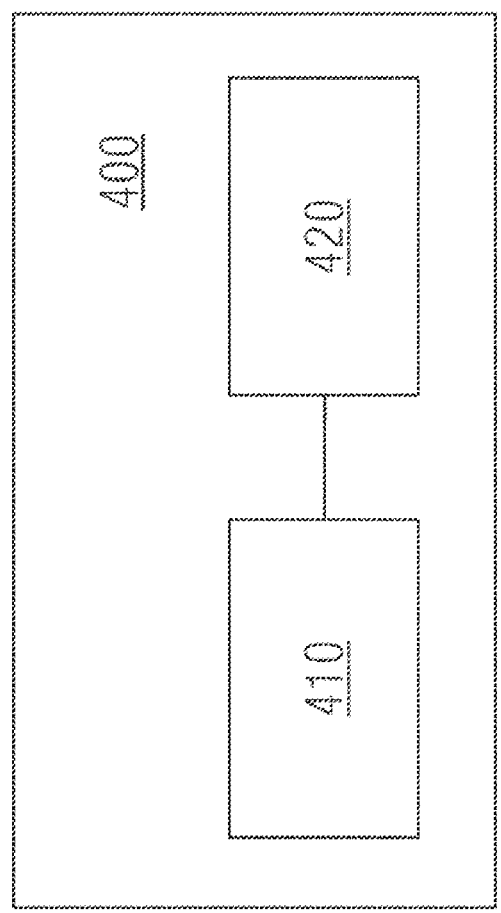

MOTION CONTROL METHOD AND APPARATUS

TECHNICAL FIELD

The present disclosure relates to the field of motion control. Various embodiments of the teachings herein include motion control methods and/or apparatus.

BACKGROUND

Optimizing motion control is crucial for improving the performance of a product production line; for example, optimizing synchronous multi-axis position control and optimizing speed control of a servomotor can clearly improve the performance of a product production line. Motion control optimization is generally achieved by means of selecting model parameters. A dynamic model of a controlled object (such as a driver) is designed by an experienced field expert. Better motion control performance is obtained by selection of a suitable model and optimized model parameters, but this manual optimization process requires much time and effort and is inefficient.

To overcome defects of manual optimization, reinforcement learning has been introduced to learn optimal parameters in a motion control model; this type of reinforcement learning may achieve automated optimization. However, deeper field knowledge is required to model the controlled object, and limited by the motion model itself, the performance improving effect is limited. In addition, a reinforcement learning model is only suitable for the current controlled object and cannot be reapplied to another controlled object.

SUMMARY

To solve the above technical problems, the present disclosure describes motion control methods and apparatus which may improve the efficiency of modeling a reinforcement learning model in motion control. For example, some embodiments include a motion control method comprising: determining a motion control model of a controlled object, training an online reinforcement learning model according to the motion control model, the motion control model outputting a model control value, and the controlled object producing a feedback value according to the model control value and an initial control value output by the online reinforcement learning model; using the model control value and the feedback value to calculate a reward; and the online reinforcement learning model generating a residual control value according to the reward, the model control value and the feedback value, and controlling motion of the controlled object according to the residual control value and the model control value. An online reinforcement learning model is obtained by training on the basis of a motion control model, without needing to start training from the beginning, increasing training efficiency of the online reinforcement learning model.

In some embodiments, the motion control method comprises: sending the motion control model, the model control value, the feedback value and the reward to the cloud, training an offline reinforcement learning model according to the motion control model, the model control value, the feedback value and the reward, and using the offline reinforcement learning model to update the existing online reinforcement learning model, or deploying the offline reinforcement learning model in a motion control system without an online reinforcement learning model. Data of the controlled object collected in the online reinforcement learning process is uploaded to the cloud to be classified and used to train the offline reinforcement learning model, which may be deployed in motion control systems of the same kinematics type, improving the universality of the reinforcement learning model in motion control.

In some embodiments, before updating the online reinforcement learning model to the offline reinforcement learning model, the method comprises: acquiring a kinematics type of the controlled object, and when the kinematics type of the controlled object is the same as a kinematics type of the offline reinforcement learning model, using the offline reinforcement learning model to update the existing online reinforcement learning model, or deploying the offline reinforcement learning model in a motion control system without an online reinforcement learning model. By judging the consistency of the kinematics type of the controlled object and the kinematics type of the offline reinforcement learning model, the specificity of updating or deployment may be improved.

In some embodiments, the model control value comprises an axis position control value, the feedback value comprises an axis position feedback value, and the step of using the model control value and the feedback value to calculate a reward comprises: calculating an axis position following error according to the axis position control value and the axis position feedback value, and calculating the reward according to the axis position following error. The reward is calculated by means of the feedback value and the control value of the axis position.

In some embodiments, determining a motion control model of a controlled object comprises: receiving a user selected kinematics type and input model parameter, and the controlled object being activated under the kinematics type and the model parameter. For this reason, a user only needs to roughly choose a kinematics type and input model parameter; optimizing parameters is unnecessary, reducing modeling requirements for a user, and increasing automation and intelligence of motion control.

In some embodiments, after the motion control model, the model control value, the feedback value and the reward are sent to the cloud, the motion control model, the model control value, the feedback value and the reward are classified into multiple training datasets, and the multiple training datasets are used to train the offline reinforcement learning model. The offline reinforcement learning model is trained.

As another example, some embodiments include a motion control apparatus comprising: a determination module, which determines a motion control model of a controlled object, training an online reinforcement learning model according to the motion control model, the motion control model outputting a model control value, and the controlled object producing a feedback value according to the model control value and an initial control value output by the online reinforcement learning model; a reward calculation module, which uses the model control value and the feedback value to calculate a reward; and a control module, the online reinforcement learning model generating a residual control value according to the reward, the model control value and the feedback value, and controlling motion of the controlled object according to the residual control value and the model control value.

In some embodiments, the motion control apparatus acts to: send the motion control model, the model control value, the feedback value and the reward to the cloud, train an offline reinforcement learning model according to the motion control model, the model control value, the feedback value and the reward, and use the offline reinforcement learning model to update the existing online reinforcement learning model, or deploy the offline reinforcement learning model in a motion control system without an online reinforcement learning model.

In some embodiments, before updating the online reinforcement learning model to the offline reinforcement learning model the apparatus may: acquire a kinematics type of the controlled object, and when the kinematics type of the controlled object is the same as a kinematics type of the offline reinforcement learning model, use the offline reinforcement learning model to update the existing online reinforcement learning model, or deploy the offline reinforcement learning model in a motion control system without an online reinforcement learning model.

In some embodiments, the model control value comprises an axis position control value, the feedback value comprises an axis position feedback value, and using the model control value and the feedback value to calculate a reward comprises: calculating an axis position following error according to the axis position control value and the axis position feedback value, and calculating the reward according to the axis position following error.

In some embodiments, determining a motion control model of a controlled object comprises receiving a user selected kinematics type and input model parameter, and the controlled object being activated under the kinematics type and the model parameter.

In some embodiments, after the motion control model, the model control value, the feedback value and the reward are sent to the cloud, the motion control model, the model control value, the feedback value and the reward are classified into multiple training datasets, the multiple training datasets are used to train the offline reinforcement learning model.

As another example, some embodiments include an electronic device comprising a processor, a memory, and instructions stored in the memory, wherein one or more of the methods described herein are implemented when the instructions are executed by the processor.

In some embodiments, a computer-readable storage medium stores a set of computer instructions which execute one or more of the methods described herein when the computer instruction is run.

BRIEF DESCRIPTION OF THE DRAWINGS

The accompanying drawings below are merely intended to illustrate and explain teachings of the present disclosure schematically, without limiting the scope thereof, where:

FIG. 4 is a schematic diagram of an example electronic device incorporating teachings of the present disclosure.

Key to labels used in the drawings:

| | |
|---|---|
| 100 | motion control method |
| 110-130 | steps |
| 210 | controller |
| 211 | motion control model |
| 212 | transceiver |
| 220 | edge device |
| 221 | data collection module |
| 222 | reward calculation module |
| 223 | online reinforcement learning model |
| 230 | the cloud |
| 231 | training data processing module |
| 232 | training dataset |
| 233 | offline reinforcement learning model |
| 300 | motion control apparatus |
| 310 | determination module |
| 320 | reward calculation module |
| 330 | control module |
| 400 | electronic device |
| 410 | processor |
| 420 | memory |

DETAILED DESCRIPTION

To enable clearer understanding of the technical features, objectives and effects of the teachings of the present disclosure, particular embodiments thereof are now explained with reference to the accompanying drawings. Many specific details are expounded in the description below to facilitate full understanding of the present invention, but the present disclosure may also be implemented in other ways different from those described here, and is not limited by the particular embodiments disclosed below.

As shown in the present application and the claims, unless the context clearly indicates an exception, words such as "a", "one", "a type of" and/or "the" do not specifically mean the singular, but may also include the plural. In general, the terms "comprise" and "include" only indicate inclusion of steps and elements that have been clearly marked, but these steps and elements do not constitute an exclusive list; methods or devices might also include other steps or elements.

Figure 1:
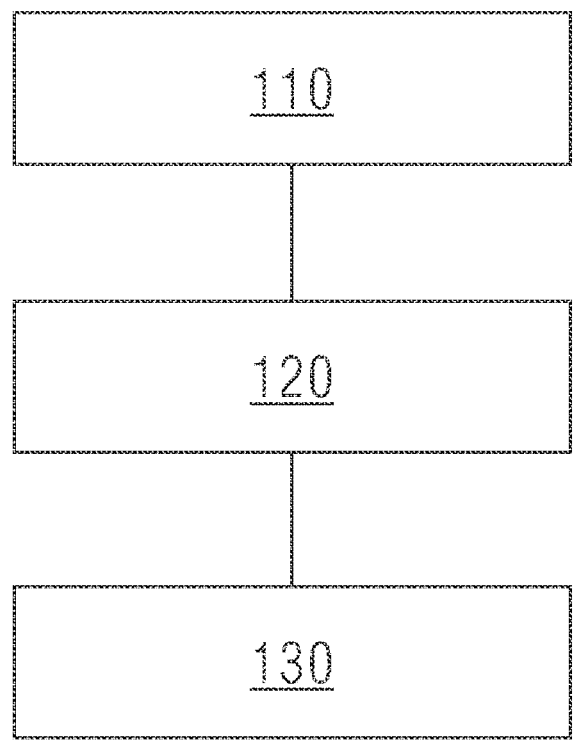
FIG. 1 is a flow chart of an example motion control method incorporating teachings of the present disclosure.

FIG. 1 is a flow chart of an example motion control method incorporating teachings of the present disclosure. As shown in FIG. 1, the motion control method 100 comprises:

Step 110, determining a motion control model of a controlled object, training an online reinforcement learning model according to the motion control model, the motion control model outputting a model control value, and the controlled object producing a feedback value according to the model control value and an initial control value output by the online reinforcement learning model.

In some embodiments, the step of determining a motion control model of a controlled object comprises: receiving a user selected kinematics type and input model parameter, and the controlled object being activated under the kinematics type and the model parameter. For this reason, the user only needs to adjust the model parameter until the controlled object can be activated; it is not necessary for the user to optimize the parameter, clearly reducing workload and increasing motion control efficiency.

The kinematics type may be designed or selected by a user on the basis of an application requirement or kinematics of the controlled object (for example, a single-axis driver or a synchronous multi-axis driver). By way of example, proportional-integral-derivative (PID) control is chosen for a single-axis driver, or Cartesian position control is chosen for a synchronous multi-axis driver. At this stage, by means of selecting a kinematics type of a motion control model and an initial input parameter of the motion control model, a motion control model of a controlled object may be determined, and this motion control model outputs a model control value $U_m$. In addition, an online reinforcement learning model is trained according to the motion control model; the online reinforcement learning model outputs an initial control value $U_{a0}$ at an initial moment; the controlled object moves on the basis of the model control value $U_m$ and the initial control value $U_{a0}$, and produces a feedback value in the process of moving; the feedback value may be an axis position value, an axis speed value, an axis torque value, etc.

Figure 2:
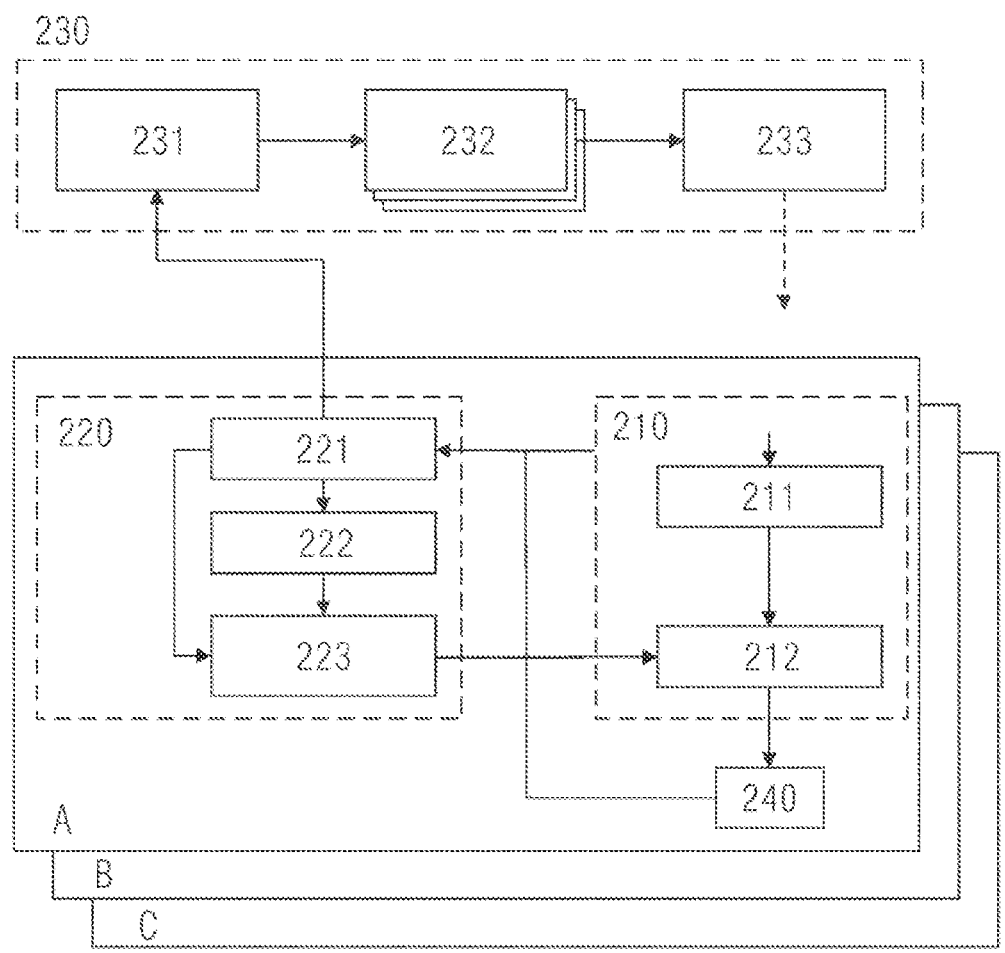
FIG. 2 is a schematic diagram of an example motion control method incorporating teachings of the present disclosure.

FIG. 2 is a schematic diagram of an example motion control method incorporating teachings of the present disclosure. FIG. 2 shows multiple motion control systems A, B, C, and each motion control system comprises a control apparatus and a controlled object. Taking motion control system A for example, the control apparatus comprises an edge device 220 and a controller 210, the controlled object is a driver 240, and the driver 240 may drive electrical machinery to rotate.

In some embodiments, the control apparatus may also be a single hardware form. The edge device 220 may be an industrial personal computer (IPC), and the controller 210 may be a programmable logic controller (PLC); in other forms, the control apparatus may be an industrial personal computer, internally configured to have a virtual PLC, or the control apparatus may be a PLC, with an internally integrated calculation module.

As shown in FIG. 2, the controller 210 comprises a motion control model 211; for the motion control model 211, a user may select a kinematics type of the motion control model, for example PID control or Cartesian position control, and input a model parameter, and thus determine the motion control model 211; the motion control model 211 outputs a model control value $U_m$; an online reinforcement learning model is trained according to the motion control model; the online reinforcement learning model outputs an initial control value $U_{a0}$ at an initial moment; the controlled object moves on the basis of the model control value $U_m$ and the initial control value $U_{a0}$, and produces a feedback value in the process of moving.

Step 120, using the model control value and the feedback value to calculate a reward. According to the motion control model and the driver kinematics type, the model control value and the feedback value may be used to calculate the reward, for example an axis position following error, an axis speed following error, an axis torque following error, a Cartesian position following error and a Cartesian speed following error, etc. In some embodiments, the model control value comprises an axis position control value, the feedback value comprises an axis position feedback value, and the step of using the model control value and the feedback value to calculate a reward comprises: calculating an axis position following error according to the axis position control value and the axis position feedback value, and calculating the reward according to the axis position following error.

For example, for a single-axis driver, the reward may be calculated by the following formula:

$$r = 1/|err_{pos}|$$

wherein r is the reward, $err_{pos}$ is the axis position following error, and the axis position n following error may be obtained by subtracting the feedback axis position value from the model axis position control value.

For a further example, for a synchronous multi-axis driver, the reward may be calculated by the following formula:

$$r = 1/\|err_x + err_y + err_z\|$$

wherein r is the reward, and $err_x$, $err_y$, $err_z$ are respectively Cartesian position errors of X, Y and Z directions.

As shown in FIG. 2, the data collection module 221 collects a model control value output by the motion control model 211 and a feedback value produced by the driver 240; the model control value and the feedback value are sent to the reward calculation module 222; and the reward calculation module 222 calculates a reward according to the model control value and the feedback value, and sends the reward to the reinforcement learning model 223.

Step 130, the online reinforcement learning model generating a residual control value according to the reward, the model control value and the feedback value, and controlling motion of the controlled object according to the residual control value and the model control value. A SARSA (state-action-reward-state-action) algorithm may be used to train the online reinforcement learning model; the trained online reinforcement learning model generates a residual control value $U_a$ according to the reward, the model control value and the feedback value, and motion of the controlled object is controlled according to the residual control value $U_a$ and the model control value $U_m$.

As shown in FIG. 2, the reinforcement learning model 223 receives the reward sent by the reward calculation module 222, receives the model control value and the feedback value sent by the data collection module, generates a residual control value $U_a$ according to the reward, the model control value and the feedback value, and sends the residual control value to the transceiver 212 in the controller 210; the transceiver 212 sends the residual control value $U_a$ and the model control value $U_m$ to the driver 240; the controlled object moves on the basis of the residual control value $U_a$ and the model control value $U_m$, and continues to produce feedback values in the process of moving; the feedback values are continuously sent to the data collection module 221, and the preceding process is reiterated until the following error is eliminated, and predictive control is achieved at this stage.

In some embodiments, to increase the universality of the control model, the motion control method may comprise sending data (comprising the motion control model, the model control value, the feedback value and the reward, etc.) collected in multiple control system online reinforcement learning processes to the cloud, and training a universal offline reinforcement learning model according to the motion control model, the model control value, the feedback value and the reward. Relevant data used for training the offline reinforcement learning model must be collected from a controlled object with the same kinematics type and a control system thereof.

In some embodiments, before updating the online reinforcement learning model to the offline reinforcement learning model the method may comprise: acquiring a kinematics type of the controlled object, and when the kinematics type of the controlled object is the same as a kinematics type of the offline reinforcement learning model, using the offline reinforcement learning model to update the existing online reinforcement learning model, or deploying the offline reinforcement learning model in a motion control system without an online reinforcement learning model.

In some embodiments, after the motion control model, the model control value, the feedback value and the reward are sent to the cloud, the motion control model, the model control value, the feedback value and the reward are classified into multiple training datasets, and the multiple training datasets are used to train the offline reinforcement learning model. By way of example, a COL (conservative Q-learning) algorithm may be used to train an offline reinforcement learning model.

Still referring to FIG. 2, the cloud 230 further comprises a training data processing module 231, a training dataset 232, and an offline reinforcement learning model 233; the data collection module 231 sends the motion control model, the model control value, the feedback value and the reward to the training data processing module 231 of the cloud 230; the training data processing module 231 classifies the motion control model, the model control value, the feedback value and the reward into multiple training datasets 232 according to kinematics type; the multiple training datasets 232 are used to train the offline reinforcement learning model 233 using the COL algorithm, so that the offline reinforcement learning model 233 is trained; the trained offline reinforcement learning model 233 is updated in the online reinforcement learning model of motion control system A, or deployed in motion control system B or C without an online reinforcement learning model, thereby increasing the universality of the reinforcement learning model in motion control. To improve the specificity of deployment or updating, before the step of deployment or updating, the kinematics type of the controlled object is acquired, and when the kinematics type of the controlled object is the same as a kinematics type of the offline reinforcement learning model 233, the offline reinforcement learning model is used to update the existing online reinforcement learning model, or the offline reinforcement learning model is deployed in a motion control system without an online reinforcement learning model.

Teachings of the present disclosure include motion control methods, wherein an online reinforcement learning model is obtained by training on the basis of a motion control model, without needing to start training from the beginning, increasing training efficiency of the online reinforcement learning model. In addition, data of the controlled object collected in the online reinforcement learning process is uploaded to the cloud to be classified and used to train the offline reinforcement learning model, which may be deployed in a motion control system of the same kinematics type, increasing the universality of the reinforcement learning model in motion control.

Figure 3:
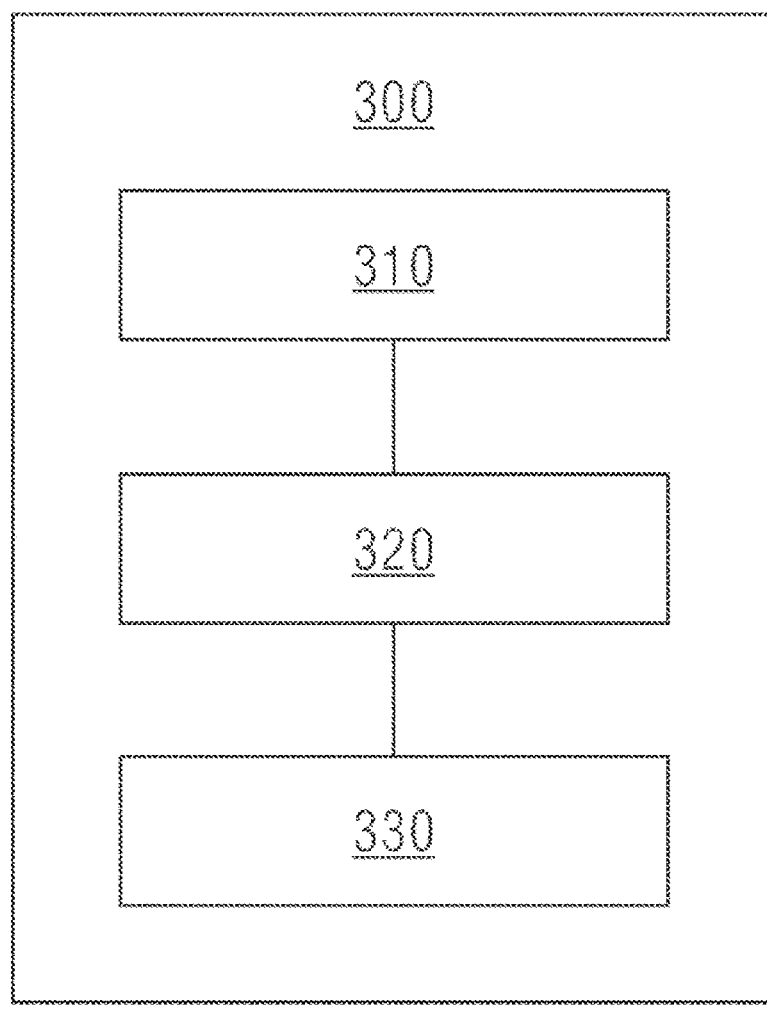
FIG. 3 is a schematic diagram of an example motion control apparatus incorporating teachings of the present disclosure.

Some embodiments include a motion control apparatus; FIG. 3 is a schematic diagram of a motion control apparatus 300 incorporating teachings of the present disclosure, as shown in FIG. 3, the motion control apparatus 300 comprising: a determination module 310, which determines a motion control model of a controlled object, training an online reinforcement learning model according to the motion control model, the motion control model outputting a model control value, and the controlled object producing a feedback value according to the model control value and an initial control value output by the online reinforcement learning model; a reward calculation module 320, which uses the model control value and the feedback value to calculate a reward; and a control module 330, the online reinforcement learning model generating a residual control value according to the reward, the model control value and the feedback value, and controlling motion of the controlled object according to the residual control value and the model control value.

In some embodiments, the motion control apparatus 300 comprises: sending the motion control model, the model control value, the feedback value and the reward to the cloud, training an offline reinforcement learning model according to the motion control model, the model control value, the feedback value and the reward, and using the offline reinforcement learning model to update the existing online reinforcement learning model, or deploying the offline reinforcement learning model in a motion control system without an online reinforcement learning model.

In some embodiments, before updating the online reinforcement learning model to the offline reinforcement learning model, the method may comprise: acquiring a kinematics type of the controlled object, and when the kinematics type of the controlled object is the same as a kinematics type of the offline reinforcement learning model, using the offline reinforcement learning model to update the existing online reinforcement learning model, or deploying the offline reinforcement learning model in a motion control system without an online reinforcement learning model.

In some embodiments, the model control value comprises an axis position control value, the feedback value comprises an axis position feedback value, and the step of using the model control value and the feedback value to calculate a reward comprises: calculating an axis position following error according to the axis position control value and the axis position feedback value, and calculating the reward according to the axis position following error.

In some embodiments, the step of determining a motion control model of a controlled object comprises: receiving a user selected motion control model and input model parameter, and the controlled object being activated under the motion control model and the model parameter.

In some embodiments, after the motion control model, the model control value, the feedback value and the reward are sent to the cloud, the motion control model, the model control value, the feedback value and the reward are classified into multiple training datasets, and the multiple training datasets are used to train the offline reinforcement learning model.

Some embodiments include an electronic device 400. FIG. 4 shows a schematic diagram an of example electronic device 400 incorporating teachings of the present disclosure. As shown in FIG. 4, the electronic device 400 comprises a processor 410 and a memory 420, wherein the memory 420 stores an instruction, and the method 100 described above is implemented when the instruction is executed by the processor 410.

Some embodiments include a computer-readable storage medium on which a computer instruction is stored, one or more of the methods described herein executed when the computer instruction is run. Some embodiments may be implemented wholly by hardware, wholly by software (including firmware, terminate-and-stay-resident software, microcode, etc.), or by a combination of hardware and software. All of the above hardware or software may be referred to as a "data block", "module", "engine", "unit", "component" or "system". The processor may be one or more application-specific integrated circuit (ASIC), digital signal processor (DSP), digital signal processing device (DAPD), programmable logic device (PLD), field programmable gate array (FPGA), processor, controller, microcontroller, microprocessor or a combination thereof. In addition, the various aspects may include a computer product located in one or more computer readable medium, the product comprising computer readable program code. For example, computer readable media may comprise, but are not limited to, magnetic storage devices (e.g. hard disks, floppy disks, magnetic tapes . . . ), optical disks (e.g. compact disks (CD), digital versatile disks (DVD) . . . ), smart cards and flash memory devices (e.g. cards, sticks, key drives . . . ).

A flow chart has been used here to explain the operations performed in an example method incorporating teachings of the present disclosure. It should be understood that the abovementioned operations are not necessarily performed precisely in order. On the contrary, the various steps may be processed in reverse order or simultaneously. Moreover, other operations may be added to these processes, or one or more operation steps may be removed from these processes.

Although the present description is based on various embodiments, it is by no means the case that each embodiment contains just one independent technical solution. Such a method of presentation is adopted in the description purely for the sake of clarity. Those skilled in the art should consider the description in its entirety.

The technical solutions in the various embodiments could also be suitably combined to form other embodiments understandable to those skilled in the art.

The embodiments above are merely particular schematic embodiments of teachings of the present disclosure, which are not intended to limit the scope thereof. All equivalent changes, amendments and combinations made by any person skilled in the art without departing from the concept and principles of the present disclosure shall fall within the scope of protection thereof.

What is claimed is:

1. A motion control method comprising:

creating a motion control model of a controlled object;

training an online reinforcement learning model with the motion control model to generate a model control value;

producing a feedback value using the controlled object using the model control value and an initial control value generated by the online reinforcement learning model;

calculating a reward using the model control value and the feedback value;

generating a residual control value using the online reinforcement learning model based on the reward, the model control value, and the feedback value;

controlling motion of the controlled object based on the residual control value and the model control value;

sending the motion control model, the model control value, the feedback value, and the reward to a cloud computing system;

training an offline reinforcement learning model in the cloud using the motion control model, the model control value, the feedback value, and the reward;

before updating the online reinforcement learning model to the offline reinforcement learning model:

acquiring a kinematics type of the controlled object; and if the kinematics type of the controlled object is the same as a kinematics type of the offline reinforcement learning model, using the offline reinforcement learning model to update the existing online reinforcement learning model, else deploying the offline reinforcement learning model in a motion control system without an online reinforcement learning model.

2. A motion control method comprising:

creating a motion control model of a controlled object;

training an online reinforcement learning model with the motion control model to generate a model control value;

producing a feedback value using the controlled object using the model control value and an initial control value generated by the online reinforcement learning model;

calculating a reward using the model control value and the feedback value;

generating a residual control value using the online reinforcement learning model based on the reward, the model control value, and the feedback value;

controlling motion of the controlled object based on the residual control value and the model control value;

sending the motion control model, the model control value, the feedback value, and the reward to the cloud;

training an offline reinforcement learning model in the cloud using the motion control model, the model control value, the feedback value, and the reward; and updating the existing online reinforcement learning model using the offline reinforcement learning model or deploying the offline reinforcement learning model in a motion control system without an online reinforcement learning model;

wherein the model control value comprises an axis position control value;

the feedback value comprises an axis position feedback value; and using the model control value and the feedback value to calculate a reward comprises: calculating an axis position following error according to the axis position control value and the axis position feedback value, and calculating the reward according to the axis position following error.

3. The motion control method as claimed in claim 1, wherein:

the model control value comprises an axis position control value;

the feedback value comprises an axis position feedback value; and using the model control value and the feedback value to calculate a reward comprises: calculating an axis position following error according to the axis position control value and the axis position feedback value, and calculating the reward according to the axis position following error.

4. The motion control method as claimed in claim 2, wherein creating a motion control model of a controlled object comprises: receiving a user selected kinematics type and input model parameter, and activating the controlled object under the kinematics type and the model parameter.

* * * * *